United States Patent
Mizunuma et al.

(10) Patent No.: US 11,711,387 B2
(45) Date of Patent: Jul. 25, 2023

(54) SECURITY MANAGEMENT DEVICE, SECURITY MANAGEMENT METHOD, AND COMPUTER PROGRAM EXECUTED BY SECURITY MANAGEMENT DEVICE

(71) Applicant: DENSO CORPORATION, Kariya (JP)

(72) Inventors: Kotaro Mizunuma, Kariya (JP); Takeshi Nakamura, Kariya (JP); Takeshi Sugashima, Kariya (JP)

(73) Assignee: DENSO CORPORATION, Kariya (JP)

( * ) Notice: Subject to any disclaimer, the term of this patent is extended or adjusted under 35 U.S.C. 154(b) by 48 days.

(21) Appl. No.: 17/190,455

(22) Filed: Mar. 3, 2021

(65) Prior Publication Data

US 2021/0281594 A1 Sep. 9, 2021

(30) Foreign Application Priority Data

Mar. 5, 2020 (JP) .................................. 2020-037665

(51) Int. Cl.
*H04L 9/40* (2022.01)
*H04W 12/122* (2021.01)

(52) U.S. Cl.
CPC ...... *H04L 63/1425* (2013.01); *H04L 63/1441* (2013.01); *H04W 12/122* (2021.01)

(58) Field of Classification Search
CPC .......... H04L 63/1425; H04L 63/1441; H04W 12/122
See application file for complete search history.

(56) References Cited

U.S. PATENT DOCUMENTS

| | | | | |
|---|---|---|---|---|
| 2008/0250128 | A1* | 10/2008 | Sargent | H04L 43/106 709/223 |
| 2012/0166142 | A1* | 6/2012 | Maeda | G06K 9/6251 702/185 |
| 2014/0325649 | A1* | 10/2014 | Zhang | H04L 43/026 726/23 |
| 2015/0020152 | A1* | 1/2015 | Litichever | G06F 21/6218 726/1 |
| 2015/0113638 | A1* | 4/2015 | Valasek | G06F 21/562 726/22 |
| 2016/0019389 | A1* | 1/2016 | Yan | H04L 63/101 726/23 |
| 2016/0188396 | A1* | 6/2016 | Sonalker | G06F 11/079 714/37 |

(Continued)

OTHER PUBLICATIONS

Kwon et al., "Mitigation mechanism against in-vehicle network intrusion by reconfiguring ECU and disabling attack packet", Oct. 2018, International Conference on Information Technology, pp. 1-5 (Year: 2018).*

*Primary Examiner* — Kenneth W Chang
(74) *Attorney, Agent, or Firm* — Harness, Dickey & Pierce, P.L.C.

(57) ABSTRACT

A security management device includes a management unit, a determination unit, and an output unit. The management unit is configured to manage an anomaly location of an anomaly in a system in which a plurality of electronic controllers are connected through a network, and an anomaly amount in the anomaly location. The determination unit is configured to determine whether or not to implement countermeasures against the anomaly based on the anomaly location and the anomaly amount. The output unit is configured to output an instruction based on a determination result by the determination unit.

12 Claims, 5 Drawing Sheets

(56) References Cited

U.S. PATENT DOCUMENTS

2016/0381067 A1* 12/2016 Galula ................ H04L 63/1416
  726/23
2017/0279685 A1* 9/2017 Mota .................... H04L 41/046
2017/0286682 A1 10/2017 Stappert
2018/0027004 A1* 1/2018 Huang .................. H04L 63/162
  726/23
2018/0076955 A1* 3/2018 Shields .................. H04L 63/06

* cited by examiner

US 11,711,387 B2

SECURITY MANAGEMENT DEVICE, SECURITY MANAGEMENT METHOD, AND COMPUTER PROGRAM EXECUTED BY SECURITY MANAGEMENT DEVICE

CROSS REFERENCE TO RELATED APPLICATION

This application is based on and incorporates herein by reference Japanese Patent Application No. 2020-037665 filed on Mar. 5, 2020.

TECHNICAL FIELD

The present disclosure relates to a security management device, a security management method, a computer program executed by the security management device.

BACKGROUND

In recent years, technologies for driving support and automated driving control, including V2X such as vehicle-to-vehicle communication and road-to-vehicle communication, have been attracting attention. Along with this, vehicles have come to be equipped with a communication function, and vehicles are becoming more connected. As a result, vehicles may be increasingly vulnerable to cyber attacks.

Since cyber attacks on vehicles may interfere with vehicle control, it may be important to detect them in advance and to implement countermeasures when there is a possibility of a cyber attack.

SUMMARY

According to a first aspect of the present disclosure, a security management device includes a management unit, a determination unit, and an output unit. The management unit is configured to manage an anomaly location of an anomaly in a system in which a plurality of electronic controllers are connected through a network, and an anomaly amount in the anomaly location. The determination unit is configured to determine whether or not to implement countermeasures against the anomaly based on the anomaly location and the anomaly amount. The output unit is configured to output an instruction based on a determination result by the determination unit.

According to a second aspect of the present disclosure, a security management method includes: acquiring an anomaly location of an anomaly in a system in which a plurality of electronic controllers are connected through a network, and an anomaly amount in the anomaly location; determining whether or not to implement countermeasures against the anomaly based on the anomaly location and the anomaly amount; and outputting an instruction based on a determination result in the determining.

According to a third aspect of the present disclosure, a computer program product stored on a non-transitory computer readable medium and comprising instructions configured to, when executed by a security management device, cause the security management device to: acquire an anomaly location of an anomaly in a system in which a plurality of electronic controllers are connected through a network, and an anomaly amount in the anomaly location; determine whether or not to implement countermeasures against the anomaly based on the anomaly location and the anomaly amount; and output an instruction based on the determination result.

DETAILED DESCRIPTION

Comparative Example

Figure 1:
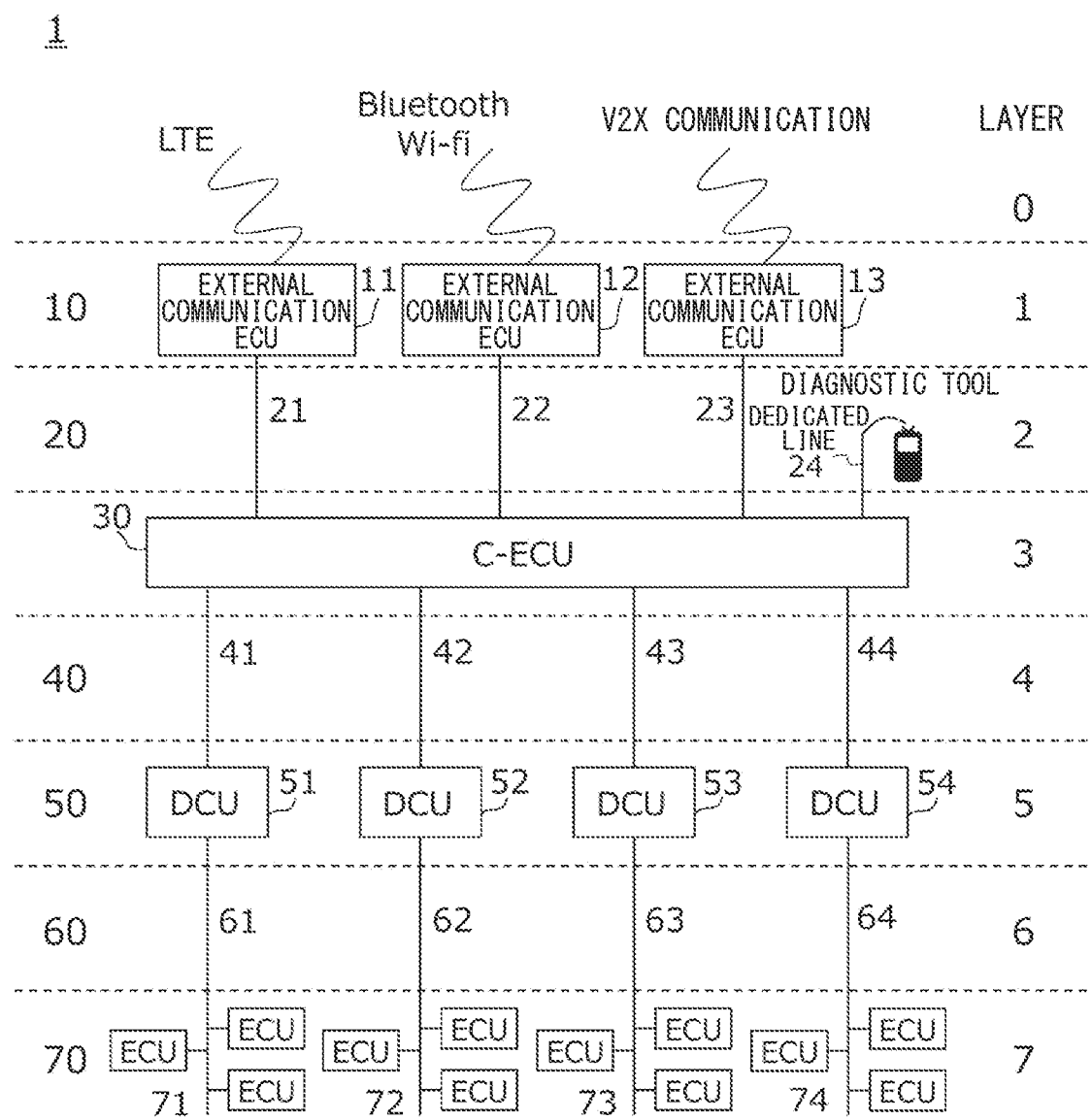
FIG. 1 is a diagram illustrating an example of a system that a security management device manages.

For example, a comparative example determines the threat level of a detected attack and activating countermeasures accordingly. Specifically, the number of detected attacks is counted, and when the number of attacks reaches a certain threshold value, the threat level determination unit activates available countermeasure.

Here, the present inventor has found the following problems. The threat level may be variable depending on the target location of the attack. Especially in vehicles, since electronic control units (ECUs) are installed for each function, the threat level is expected to vary greatly depending on the attack target.

However, according to the comparative example, the threshold value for triggering countermeasures is defined by the number of times an attack is detected regardless of the attack target, which may not be an effective criterion.

Embodiments of the present disclosure will be described below with reference to the drawings.

Any effects described in embodiments are effects obtained by a configuration of an embodiment as an example of this disclosure, and are not necessarily effects of this disclosure.

When there are a plurality of embodiments, the configuration disclosed in each embodiment is not limited to each embodiment alone, and may be combined across the embodiments. For example, the configuration disclosed in one embodiment may be combined with another embodiment. Further, the disclosed configurations may be collected and combined in each of the plurality of embodiments.

First Embodiment

First, a system that a security management device of the present disclosure manages will be described below with reference to FIG. 1. In the present embodiment, an electronic control system that is a vehicle architecture mounted on a vehicle is used as an example, but the present disclosure is not limited to this example.

An electronic control system 1 is a system in which multiple electronic control units (ECUs) are connected through a network. The electronic control system 1 includes: an external communication ECUs 11, 12, 13 (hereinafter, these external communication ECUs may be collectively referred to as an external communication ECU 10); networks 21, 22, 23, 24 (hereinafter, these networks may be collectively referred to as a network 20); a central electronic control unit (C-ECU) 30; networks 41, 42, 43, 44 (hereinafter, these networks may be collectively referred to as a network 40); domain control units (DCUs) 51, 52, 53, 54 (hereinafter, these DCUs may be collectively referred to as a DCU 50); networks 61, 62, 63, 64 (hereinafter, these networks may be collectively referred to as a network 60); and ECUs 71, 72, 73, 74 (hereinafter, these ECUs may be collectively referred to as an ECU 70).

The network may be a wireless communication network or a wired communication network. Moreover, these may be combined.

The external communication ECU 10 is an electronic control device configured to communicate with external devices by various communication standards. The external communication ECU 10 may communicate by any communication standard. FIG. 1 shows an example where the external communication ECU 11 is configured to perform long-distance wireless communication using LTE (Long Term Evolution: registered trademark), the external communication ECU 12 is configured perform short-distance wireless communication using Bluetooth (registered trademark) or Wi-Fi (registered trademark), and the external communication ECU 13 is configured to communicate with other vehicles and roadside units using V2X communication. The external communication ECU 10 may include multiple external communication ECUs to support multiple communication standards. The external communication ECU 10 may include only one external communication ECU to support only one communication standard. Other examples of long-distance wireless communication include W-CDMA (Wideband Code Division Multiple Access), HSPA (High Speed Packet Access), LTE-A (Long Term Evolution Advanced), 4G, 5G, and the like. In addition, DSRC (Dedicated Short Range Communication) and IEEE 802.16 (WiMAX: registered trademark) may be used.

The network 20 connects the external communication ECU 10 and the C-ECU 30. In FIG. 1, the network 21 connects the external communication ECU 11 and the C-ECU 30. The same applies to the networks 22, 23. The network 24 connects a diagnostic tool and the like and the C-ECU 30 through an interface.

The C-ECU 30 is an electronic control device that relays the communication between the ECUs through the network 20 and the network 40. That is, the C-ECU 30 serves as a gateway.

The network 40 connects the C-ECU 30 and the DCU 50. In FIG. 1, the network 41 connects the C-ECU 30 and the DCU 51. The same applies to the networks 42, 43, 44.

The DCU 50 connects the ECUs 70 through the network 60. The DCU 50 connects the ECU 70 and the C-ECU 30 through the network 40 and the network 60. When connecting ECUs that are connected to the same DCU, the DCU 50 makes a direct connection without going through the C-ECU 30. In FIG. 1, the DCU 51 connects the ECUs 71 through the network 61. Further, the DCU 51 connects the ECUs 71 and the C-ECU 30 through the networks 41, 61. That is, the DCU 50 serves as a sub gateway. The DCU 50 does not necessarily have to be provided. In that case, the network 41 and the DCU 50 may be omitted.

The network 60 connects the DCU 50 and the ECU 70. In FIG. 1, the network 61 connects the DCU 51 and the ECU 71. The same applies to the networks 62, 63, 64.

The ECU 70 is an electronic control device that implements respective functions. Any ECU may be used as the ECU 70. The ECU 70 may be, for example, a drive system electronic control device that controls an engine, a steering wheel, a brake, etc. The ECU 70 may be, for example, a vehicle-body electronic control device that controls a meter, and a power window, etc. The ECU 70 may be, for example, an information-system electronic control device such as a navigation device. The ECU 70 may be, for example, a safety-control electronic control device that controls to prevent a collision with an obstacle or a pedestrian. In FIG. 1, the ECU 71 may be a group of drive system electronic control devices, the ECU 72 may be a group of vehicle-body electronic control devices, the ECU 73 may be a group of information-system electronic control devices, and the ECU 74 may be a group of safety-control electronic control devices, for example. Focusing on these functions (domains) of ECUs, DCUs 50 may also be assigned by function. For example, the DCU 51 may be used as the drive system DCU, the DCU 52 may be used as the vehicle-body DCU, the DCU 53 may be used as the information-system DCU, and the DCU 54 may be used as the safety-control system DCU. The ECUs may be classified to have a master-slave relationship, rather than in parallel with each other. The ECUs may be classified into a master and a slave.

In FIG. 1, the networks 20, 40, 60 are in-vehicle networks and may use such communication standards as, for example, CAN (Controller Area Network), LIN (Local Interconnect Network), Ethernet (registered trademark), Wi-Fi (registered trademark), and any other suitable communication standards.

The electronic control system 1 can be classified and identified in a hierarchy in which a reference layer is the external communication ECU 10. In FIG. 1, the external communication ECU 10 is a first layer, the external communication ECU 20 is a second layer, the C-ECU 30 is a third layer, the network 40 is a fourth layer, the DCU 50 is a fifth layer, a network 60 is a sixth layer, and the ECU 70 is a seventh layer. This is a classification of the ECUs and the networks (communication lines) as a layered structure that becomes deeper in order from the side closest to the outside. When the external network outside of the electronic control system 1 is included, the external network may be a zeroth layer. Since a system that may be a target of the cyber attack has a contact point with the outside world, the layers can be defined by using the external communication ECU 10 as the reference layer. In FIG. 1, the layer with larger number is farther from the external communication ECU 10 and is the deeper layer. The numbering may be in ascending or descending order. The layer number of the external communication ECU 10 does not necessarily have to be one. For example, the external network may be the first layer.

Figure 2:
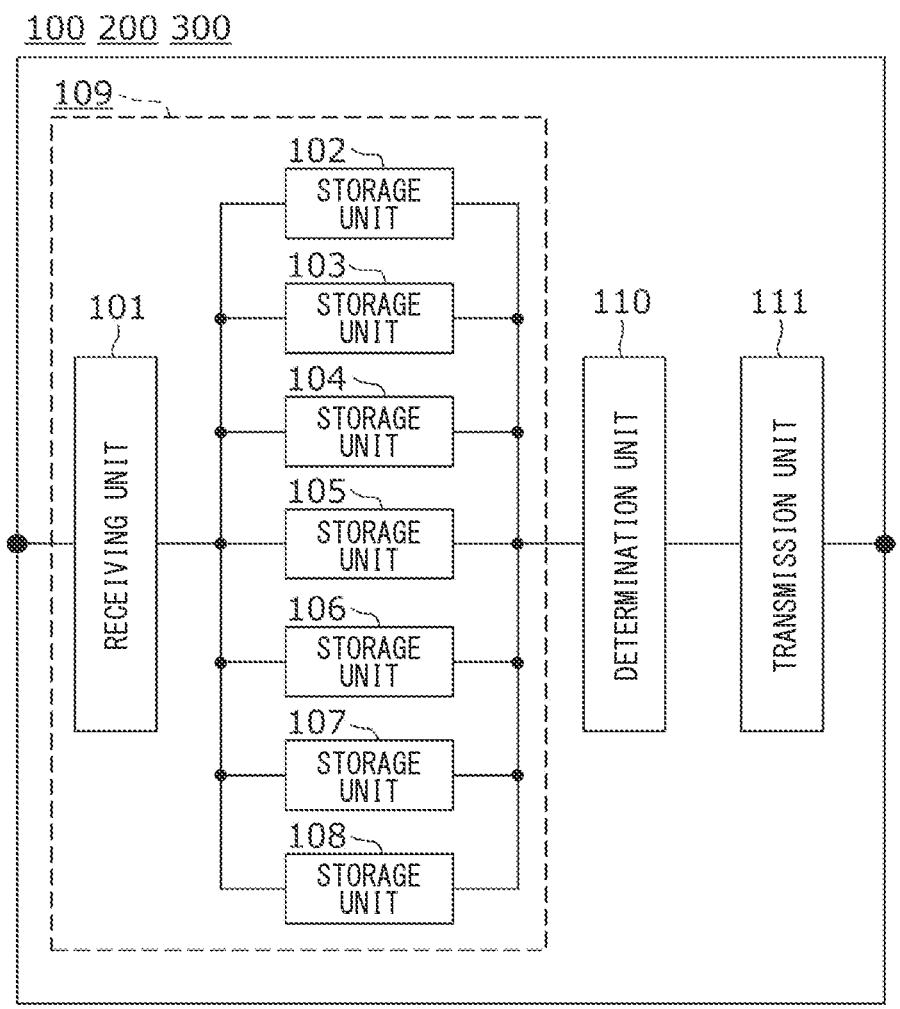
FIG. 2 is a block diagram illustrating a security management device.

The configurations of a security management device 100 of the present embodiment will be described with reference to FIG. 2. The security management device 100 includes a receiving unit 101, storage units 102-108, a determination unit 110, and a transmission unit 111. In FIG. 2, the receiving unit 101 and the storage units 102-108 collectively constitute a management unit 109. In the present embodiment, the security management device 100 is provided inside the C-ECU 30 shown in FIG. 1.

The security management device 100 may be in the form of a component, a semi-finished product, or a finished product. In the present embodiment, the security management device 100 is implemented by a semiconductor circuit in the C-ECU 30, and therefore the security management device 100 of the present embodiment is in the form of a component. Examples of the form of a component include a semiconductor module. Examples of the form of a semi-finished product include an independent electronic control unit (ECU). Examples of the form of a finished product include a server, a workstation, a personal computer (PC), a smart phone, a cell phone, and a navigation system. However, the security management device 100 is not limited to these examples.

The security management device 100 may be composed of a general-purpose CPU (Central Processing Unit), a volatile memory such as RAM, a non-volatile memory such as ROM, flash memory, or hard disk, various interfaces, and an internal bus connecting them. Then, by executing software on these hardware, the security management system 100 can be configured to perform the functions of each functional block described in FIG. 2.

The receiving unit 101 is configured to receive a detection signal indicative of an occurrence of an anomaly at "anomaly location" in the electronic control system 1. In the present embodiment, the anomaly location may be the ECUs or the networks.

Here, the anomaly location may mean (i) a specific part where the anomaly occurred, (ii) a positional relationship between a specific device and the part where the anomaly occurred, or (iii) a set of parts identified by their function.

Examples of the detection signal indicative of the anomaly location will be described below.

(a) Anomaly in External Network (Zeroth Layer)

When an abnormal communication from the outside is detected by the firewall installed in the external communication ECU 10, the external communication ECU 10 transmits the detection signal indicating that the anomaly has occurred in the external network. For example, the external communication ECU 11 transmits the detection signal indicating that the anomaly has occurred in the network using LTE communication standard.

(b) Anomaly in External Communication ECU 10 (First Layer)

The external communication ECU 10 is configured to transmits the detection signal indicative of the anomaly of the external communication ECU 10 itself based on the anti-virus function installed in the external communication ECU 10. For example, when a virus is detected in the external communication ECU 11, the external communication ECU 11 transmits the detection signal indicating that the virus has been detected in the external communication ECU 11. Alternatively, the anomaly may be detected by executing a program received from the outside in a protected area using Sandbox.

(c) Anomaly in Network 20 (Second Layer)

When a network intrusion detection system (NIDS) installed in the external communication ECU 10 or the C-ECU 30 detects a sign of an incident such as reconnaissance activities and unauthorized intrusions, the external communication ECU 10 or the C-ECU 30 transmits the detection signal indicating that the anomaly has occurred in the network 20. For example, when the NIDS in the C-ECU 30 detects the unauthorized intrusions into the network 21, the C-ECU 30 transmits the detection signal indicating that the anomaly has occurred in the network 21.

(d) Anomaly in C-ECU 30 (Third Layer)

The C-ECU 30 is configured to transmit the detection signal indicative of the anomaly of the C-ECU 30 itself based on the anti-virus function installed in the C-ECU 30.

(e) Anomaly in Network 40 (Fourth Layer)

When a network intrusion detection system (NIDS) installed in the C-ECU 30 or the DCU 50 detects a sign of an incident such as reconnaissance activities and unauthorized intrusions, the C-ECU 30 or the DCU 50 transmits the detection signal indicating that the anomaly has occurred in the network 40. For example, when the NIDS in the C-ECU 30 detects the unauthorized intrusions into the network 41, the C-ECU 30 transmits the detection signal indicating that the anomaly has occurred in the network 41.

(f) Anomaly in DCU 50 (Fifth Layer)

The DCU 50 is configured to transmit the detection signal indicative of the anomaly of the DCU 50 itself based on the anti-virus function installed in the DCU 50. For example, when a virus is detected in the DCU 51, the DCU 51 transmits the detection signal indicating that the virus has been detected in the DCU 51.

(g) Anomaly in Network 60 (Sixth Layer)

When a network intrusion detection system (NIDS) installed in the DCU 50 detects a sign of an incident such as reconnaissance activities and unauthorized intrusions, the DCU 50 transmits the detection signal indicating that the anomaly has occurred in the network 60. For example, when the NIDS in the DCU 51 detects the unauthorized intrusions into the network 61, the DCU 51 transmits the detection signal indicating that the anomaly has occurred in the network 61.

(h) Anomaly in ECU 70 (Seventh Layer)

When a message authentication function installed in the ECU 70 detects a message authentication abnormality, the ECU 70 sends a detection signal indicating that an anomaly has occurred in the ECU 70. For example, when the message authentication abnormality is detected in the ECU 71, the ECU 71 transmits the detection signal indicating that an anomaly has occurred in the ECU 71.

As described above, in the present embodiment, the detection signals transmitted to the security management device 100 contains information indicative of the anomaly location. For example, the detection signal contains an identification information for identifying the device where the anomaly has occurred. In addition, the detection signal may contain data from which the device where the anomaly has occurred can be identified by calculation.

The detection signal may contain more information other than the anomaly location. For example, the detection signal may contain: information about when the anomaly has occurred or ended; the type of the anomaly; and the identification information indicative of the device where the anomaly has been detected.

The number of the storage units is determined depending on the number of the anomaly locations to be detected. In the present embodiment, the storage units 102-108 are assigned to the anomaly locations of the external communication ECU 10 (first layer), the network 20 (second layer), the C-ECU 30 (second layer), the network 40 (fourth layer), the DCU 50 (fifth layer), the network 60 (sixth layer), and the ECU 70 (seventh layer), respectively. Each storage units 102-108 is configured to store an anomaly amount at the corresponding anomaly location. In the present embodiment, the number of times the anomaly has occurred in the ECU or the network in each layer is stored as the anomaly amount. The number of times the anomaly has occurred can be counted as the number of times the detection signal has been received. For example, when the anomaly in the external communication ECU 11 occurs once and the anomaly in the external communication ECU 12 occurs twice, the detection signal is transmitted from the first layer three times, and the storage unit 102 stores three as the number of times the anomaly has occurred.

The anomaly amount may be any index that can quantitatively evaluate the anomaly, and examples thereof include the number of anomaly occurrence, the time length while the anomaly continued, and the size or number of abnormal data.

The storage units 102-108 output the anomaly location and the anomaly amount to the determination unit 110.

In the present embodiment, the receiving unit 101 and the storage units 102-108 collectively constitute a management unit 109. That is, the management unit 109, as a whole, is configured to "manage" the anomaly location and the anomaly amount in the anomaly location.

The management unit 109 is configured to at least make it possible to grasp the anomaly location and the anomaly amount, and the "manage" here may mean at least one of acquiring, saving, and outputting the anomaly location and the anomaly amount.

As another example of the management unit 109, the receiving unit 101 of the management unit 109 may receive the detection signal containing the anomaly amount in addition to the anomaly location. Examples of the anomaly amount include the number of virus files detected in the external communication ECU 10 and the number of accesses blocked by the firewall function. The anomaly location and the anomaly amount contained in the received detection signal are stored in one of the storage units 102-108 corresponding to the anomaly location.

As another example of the management unit 109, the receiving unit 101 of the management unit 109 may receive the CAN data transmitted by the ECUs. Then, the receiving unit 101 may detect the anomaly by analyzing the CAN data and store the anomaly location and the anomaly amount in the corresponding storage unit 102-108. For example, when the interval of the transmission of the speed data transmitted from the ECU 71 is shorter than the specified transmission interval, there may be an unauthorized access from a device spoofing the ECU 71. In such a case, the receiving unit 101 stores in the storage unit 108 the ECU 71 as the anomaly location and one time as the anomaly amount. In this case, the receiving unit 101 is not just an interface but has an analysis function.

The determination unit 110 is configured to determine whether or not to implement countermeasures against the anomaly based on the anomaly location and the anomaly amount received from the storage units 102-108.

The anomaly location and the anomaly amount may be directly used in this determination. Further, the result of a predetermined calculation on the anomaly location and the anomaly amount may be used in this determination.

Figure 3:
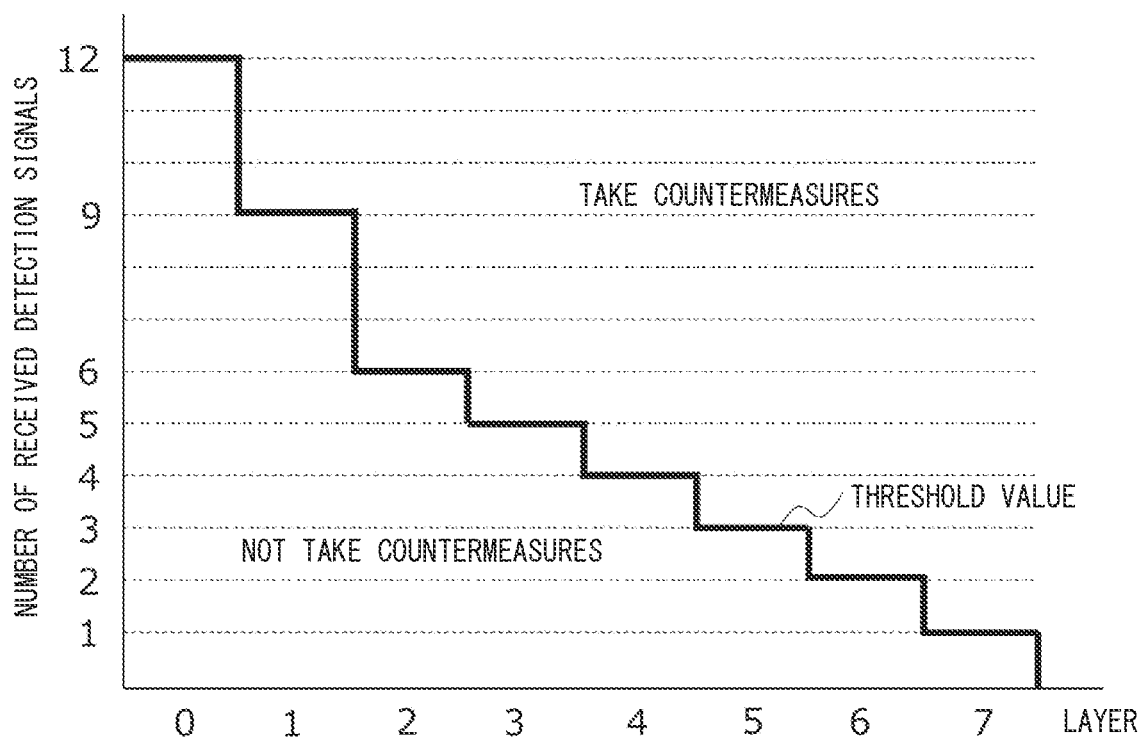
FIG. 3 is a diagram showing an example of a criteria for determining by the security management device whether or not to implement countermeasures.

FIG. 3 is a diagram showing an example of a criteria for determining by the determination unit 110 whether or not to implement countermeasures. The vertical axis of FIG. 3 is the number of times the detection signal has been received, and the horizontal axis is the layer.

The determination unit 110 may be configured to determine to take countermeasures against the anomaly with less anomaly amount when the anomaly location is farther from the external communication ECU 10. The farther the anomaly location is from the external communication ECU 10 (i.e. the deeper the layer is), the smaller the threshold value of the anomaly amount at or above which the determination unit 110 determines to implement countermeasures against the anomaly is. In the case shown in FIG. 3, when the anomaly location is the zeroth layer, the determination unit 110 determines to take countermeasures against the anomaly if the anomaly amount is 12 or more. If the anomaly amount is less than 12, the determination unit 110 determines not to take countermeasures against the anomaly. The deeper the layer is, the smaller the threshold value is. When the anomaly location is the seventh layer, the determination unit 110 determines to implement countermeasures against the anomaly with the anomaly amount of one or more.

The reason for setting such a threshold value is that a cyber attack usually consists of multiple unauthorized accesses, and the attack would be successful only when these multiple unauthorized accesses are sequentially successful. And by setting a threshold value, it is possible to prevent false positives and abnormalities other than cyber attack from being judged as attacks, thus implementation of unnecessary countermeasures can be avoided.

Further, since the threshold value becomes smaller as the layers becomes deeper, it is possible to implement countermeasures according to the degree of intrusion into the electronic control system 1 from the external communication ECU 10 which is the entrance of the cyber attack. In particular, in the case of an electronic control system 1 of a vehicle, the ECUs in the deep layers handle more important information, and there is a high possibility that the control of the vehicle will be directly affected if the ECUs at the end are hijacked. That is, the layer may correspond to the degree of urgency for cyber attacks.

Especially, in the electronic control system 1 of the present embodiment mounted on a vehicle (moving object), the determination unit 110 is configured to determine to implement countermeasures against the anomaly with the smallest anomaly amount when the anomaly location is the ECU controlling vehicle components. This configuration allows countermeasures to be implemented earlier and before a cyber attack succeeds for anomalies in the parts of the electronic control system 1 which are closer to the control target.

The moving object means a movable object, and the moving speed is not limited. The moving object may stop. For example, the moving object includes, but is not limited to, vehicles, motorcycles, bicycles, pedestrians, ships, aircraft, and objects mounted on these. The electronic control system 1 may be directly fixed to the moving object. The electronic control system 1 may move together with the moving object without being fixed to the moving object. For example, the electronic control device 1 may be carried by a person on a moving object, or electronic control device 1 may be mounted on a load placed on a moving object.

The transmission unit 111 which corresponds to an output unit is configured to output an instruction based on the determination by the determination unit 110 to a predetermined ECU of the electronic control system 1, for example.

The instruction may be a command or a data whose destination can be interpreted. The instruction may be output to the inside or the outside of the system. The instruction may be output to the outside of the security management device. The instruction may be output to a countermeasure implementation unit in the security management device.

In the present embodiment, when the abnormal communication from the outside is detected by the firewall of the external communication ECU 11, for example, the instruction to execute IP filtering is output to the external communication ECU 10 to take countermeasures in the zeroth layer. For example, when the anomaly is detected in the network 23 by the NIDS of the C-ECU 30, the instruction to execute CANID filtering is output to the C-ECU 30 to take countermeasures in the second layer. For example, when the virus is detected by the anti-virus function in the DCU 52, the instruction to restart the anti-virus function is output to the DCU 50 to take countermeasures in the fifth layer.

Countermeasures are implemented for the entire layer to which the anomaly location belongs in the above example, but countermeasures may be implemented for the specific component at the anomaly location. For example, when the abnormal communication from the outside is detected by the firewall of the external communication ECU 11, the instruction to execute IP filtering may be output only to the external communication ECU 11.

Figure 4:
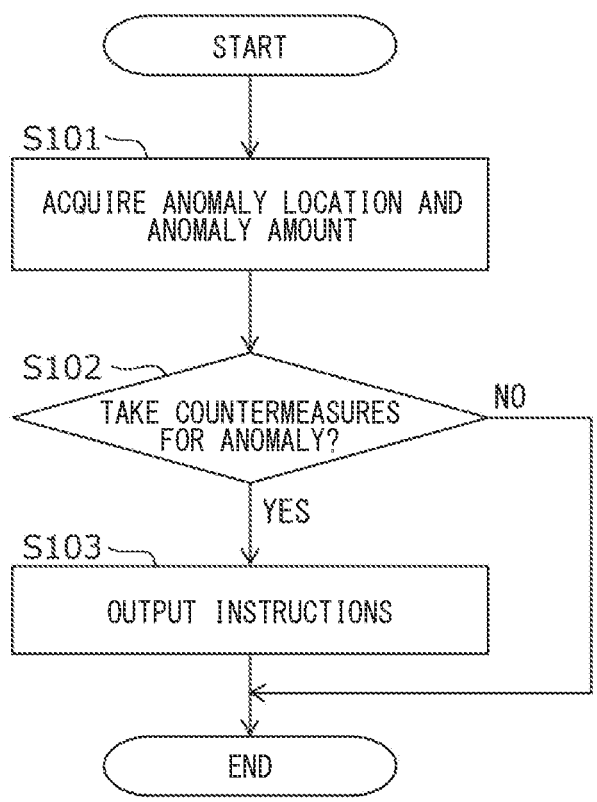
FIG. 4 is a flowchart illustrating an operation of the security management device.

Next, the operations of the security management device 100 of the present embodiment will be described with reference to FIG. 4. The following not only shows the security management method in the security management device 100, but also shows the processing procedure of the security management program executed in the security management device 100. The order of the processes is not limited to the example shown in FIG. 4. That is, the order may be swapped as long as there is no restriction, such as a relationship where one step uses the result of the step before it. This applies not only to this embodiment but also to other embodiments and modification examples.

In S101, the receiving unit 101 acquires the anomaly location by receiving the detection signal indicating the occurrence of the anomaly in the anomaly location of the electronic control system 1. The receiving unit 101 further acquires the anomaly amount in the anomaly location in S101. In the present embodiment, the anomaly amount is the number of times the detection signal is received, and the anomaly amount is acquired by counting the received detection signals. The acquired anomaly location and anomaly amount are stored in one of the storage units 102-108 corresponding to the anomaly location.

In S102, the determination unit 110 reads out the anomaly location and the anomaly amount from the storage units 102-108, and determines whether or not to implement the countermeasures against the anomaly based on the anomaly location and the anomaly amount. In the present embodiment, the determination unit 110 is configured to determine whether the number of times the detection signal is received is smaller than the threshold value determined in advance for each layer.

When the determination unit 110 determines not to implement the countermeasures against the anomaly (S102: No), the process ends. When the determination unit 110 determines to implement countermeasures against the anomaly (S102: Yes), the determination unit 110 outputs the instruction based on the determination result by the determination unit 110 (S103). In the present embodiment, the determination unit 110 is configured to transmit the instruction to execute the security measure function of the ECU to the ECU in which the anomaly is detected.

According to the security management device 100 of the present embodiment, since the anomaly location is managed as the layers, it may be possible to implement countermeasures according to the degree of risk in the layers. Further, the capacity of the storage units 102-108 storing the anomaly amount and the anomaly location can be reduced. Moreover, according to the security management device 100 of this embodiment, since the threshold value of the number of times the detection signal is received is smaller as the layer of the anomaly location is deeper, it may be possible to implement countermeasures according to the degree of intrusion into the electronic control system 1 from the entrance of the cyber attack. In addition, since the security management device 100 of this embodiment is provided in the C-ECU 30, which has the role of a gateway, the detection signals can be collected without leaks, and the instructions based on the determination result can be output without leaks.

(Modifications)

In the first embodiment, the anomaly location is identified and managed using the hierarchy whose reference layer is the external communication device. However, the anomaly location may be identified and managed on an individual ECU or network basis. According to this example, although required capacity of the storage unit may increase, it may be possible to take direct and minimal countermeasures against the detected anomaly.

The anomaly location may be identified and managed on the basis of a set of ECUs or networks with a specific function, rather than by the layer or individual ECU or network. For example, the anomaly location may be identified as a set of the safety-control system ECUs, or a set of the networks connected with the C-ECU 30. According to this example, since the anomaly location is identified for functions, countermeasures against the anomaly can be shared between the ECUs or networks.

The first embodiment and these modifications may be combined. That is, a part of the electronic control system 1 may be identified on the basis of the layers while the other parts are identified on an individual ECU or network basis.

In the first embodiment, the anomaly amount is the number of times an anomaly occurred in each ECU or network, i.e. the number of times a detection signal was received. However, the anomaly amount may be the time length for which the anomaly continued, or the size or number of abnormal data. For example, against the flood attack that is one type of DoS (Denial of Service) Attack and would make the system unavailable by sending a large number of requests or huge data, the duration of the attack, the size of the data sent, or the number of files sent may be used as the anomaly amount. The duration of the attack can be calculated by measuring the time that the bus occupancy exceeds a predetermined value, for example.

In the first embodiment, the threshold values are set for each layer, and the necessity of countermeasures is determined based on whether the number of times the anomaly occurred in each layer is smaller than the threshold value.

However, the necessity of countermeasures may be determined based on the number of times the anomaly occurred in multiple layers. For example, it may be determined to implement countermeasures against the anomaly when the following inequality is satisfied.

$$1/2a + 1/3b + 1/4c + 1/5d + 1/6e + 1/7f + 1/8g + 1/1h >= 1 \quad \text{(inequality 1)}$$

where the alphabets a-h are the number of times an anomaly occurred in first to seventh layers, respectively.

In the first embodiment, the threshold values are set on the layer basis. However, the threshold values may be different depending on whether the anomaly location is the ECU or the network. For example, in the example of FIG. 1, the first layer, the third layer, the fifth layer, and the seventh layer are ECUs. The threshold values for these layers may be one. The threshold values for these layers may be relatively small values and gradually decrease like 3, 2, 2, 1 in order. In contrast, the zeroth layer, the second layer, the fourth layer, and the sixth layer are networks. The threshold values for these layers may be relatively large and gradually decrease like 10, 7, 5, 4 in order. The reason why the threshold values for ECUs are smaller than those for networks is that ECUs are more likely to be affected by cyber attacks.

This can be explained as a difference in the anomaly detection method. For example, NIDS has a higher probability of false positives than the host intrusion detection system (HIDS). Accordingly, by setting larger threshold value for NIDS, the implementation of countermeasures against the false positives can be suppressed.

In the first embodiment, the security management device 100 is provided in the C-ECU 30. However, the security management device 100 may be provided in another ECU in the electronic control system 1. For example, the security management device 100 may be provided in any one of the external communication ECUs 10 or DCUs 50. Alternatively, a dedicated ECU may be provided in the electronic control system 1.

Further, the security management device 100 may be distributed to multiple ECUs. For example, the security management device 100 may be distributed to the external communication ECU 11, the external communication ECU 12, the external communication ECU 13, and the C-ECU 30. In this case, the external communication ECU 11 is configured to manage the anomaly location and the anomaly amount in the network using LTE, the external communication ECU 11 itself, and the network 21. The external communication ECU 12 is configured to manage the anomaly location and the anomaly amount in the network using Bluetooth (registered trademark) or Wi-Fi (registered trademark), the external communication ECU 12 itself, and the network 22. The external communication ECU 13 is configured to manage the anomaly location and the anomaly amount in the network using V2X communication, the external communication ECU 13 itself, and the network 23. The C-ECU 30 is configured to manage the anomaly location and the anomaly amount in the C-ECU 30 itself, the network 40, the DCU 50, the network 60, and the ECU 70 which are layers lower than the fourth layer.

When the security management device 100 are distributed to multiple ECUs, each part of the security management device distributed to corresponding ECU may correspond to the security management device of the present disclosure.

The security management device 100 may be provided outside the electronic control system 1.

Second Embodiment

Figure 5:
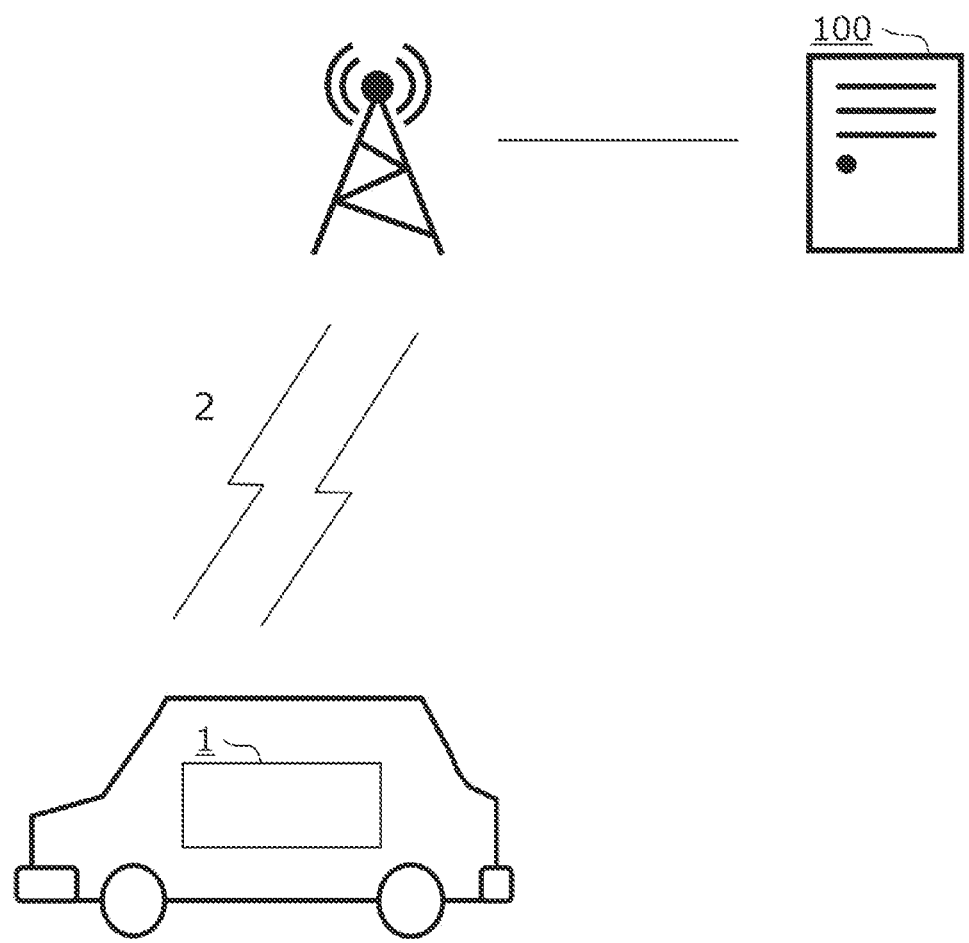
FIG. 5 is a diagram for explaining a relationship between a security management device and a system.

In the present embodiment, the security management device 100 is provided outside the electronic control system 1. The relationship between the security management device 100 and the electronic control system 1 will be described with reference to FIG. 5.

The electronic control system 1 is mounted on the vehicle and communicates with the security management device 100 through the communication network 2. The configurations of the electronic control system 1 and the security management device 100 are the same as those of the first embodiment, and the explanations are omitted.

For the communication network 2, a wireless communication may be used, such as IEEE802.11 (Wi-Fi: registered trademark), IEEE802.16 (WiMAX: registered trademark), W-CDMA (Wideband Code Division Multiple Access), HSPA (High Speed Packet Access), LTE (Long Term Evolution), LTE-A (Long Term Evolution Advanced), 4G, and 5G. DSRC (Dedicated Short Range Communication) may also be used. For the communication network 2, a wired communication may be used, such as wired LAN (Local Area Network), internet, and landline phone line.

In the present embodiment, the detection signal containing the anomaly location is transmitted from the ECU of the electronic control system 1 to the security management device 100 through the communication network 2. The security management device 100 is configured to output the instruction based on the determination result by the determination unit 110 to the predetermined ECU of the electronic control system 1 through the communication network 2.

According to the present embodiment, since the security management device 100 can be provided outside the electronic control system 1, the management can be performed using a stable device having abundant resources such as a server.

Third Embodiment

Figure 6:
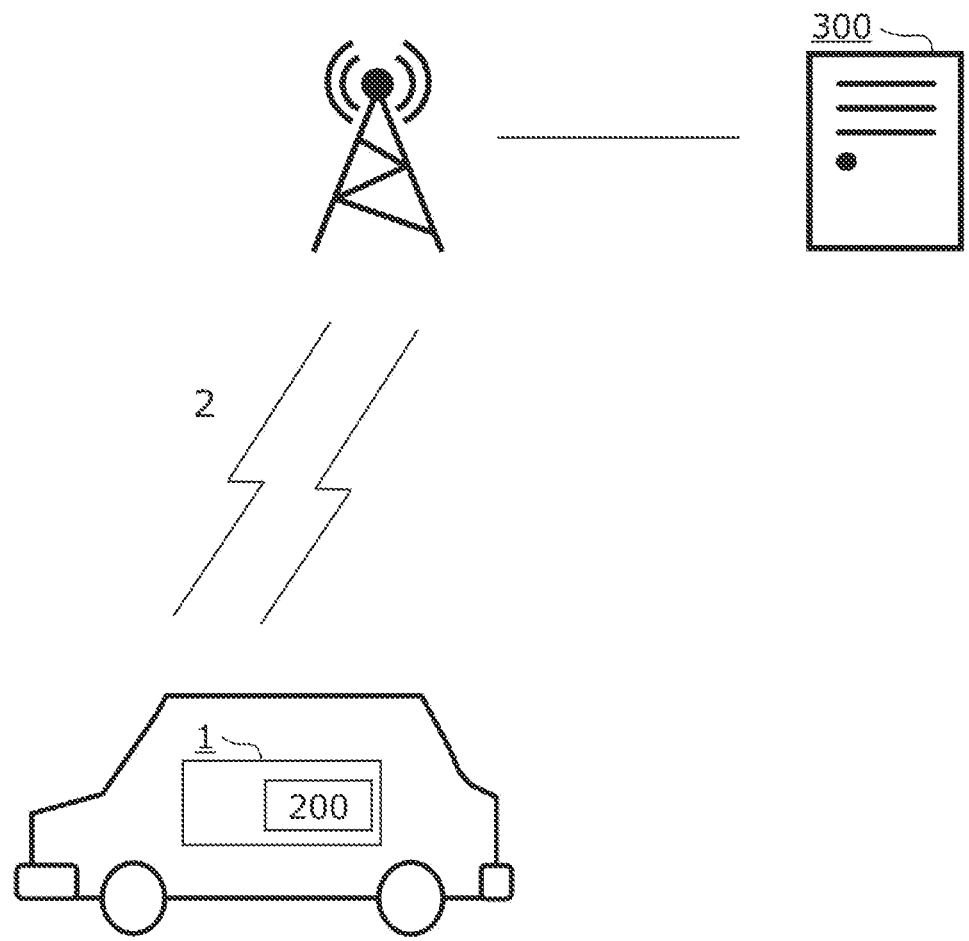
FIG. 6 is a diagram for explaining a relationship between a security management device and a system.

In the present embodiment, the security management device 100 is provided both inside the security management device 1 and outside the electronic control system 1. The present embodiment will be described with reference to FIG. 6.

A first security management device 200 is provided inside the electronic control system 1, and a second security management device 300 is provided outside the electronic control system 1. The configurations of the first security management device 200 and the second security management device 300 are the same as the security management device 100 of the first embodiment, and the explanations are omitted.

When the first security management device 200 and the second security management device 300 can communicate with each other through the communication network 2, the second security management device 300 is actuated. That is, the anomaly location and the anomaly amount in the electronic control system 1 is managed by the second security management device 300, and the second security management device 300: determines whether or not to take countermeasures against the anomaly: and outputs the instruction based on the determination result.

In contrast, when the first security management device 200 and the second security management device 300 cannot communicate with each other through the communication network, the first security management device 200 is actuated. That is, the anomaly location and the anomaly amount in the electronic control system 1 is managed by the first security management device 200, and the first security management device 200: determines whether or not to take countermeasures against the anomaly: and outputs the instruction based on the determination result.

It may be preferable that the first security management device 200 determines whether the communication between the first security management device 200 and the second security management device 300 is available. For example, the first security management device 200 may determine that the communication is not available when the external communication ECU 11 of the first security management device 200 has not received for a certain period of time.

According to the example described above, the outside security management device 300 having higher processing capacity performs the management while the communication is available, and the inside security management device 200 performs the management while the communication is not available. Accordingly, the management can be performed by the device with higher processing capacity in a normal situation, and the management can be continued even when the communication is interrupted.

In the example described above, the determination and the management of the anomaly location and the anomaly amount are selectively performed by the first security management device 200 and the second security management device 300 based on whether the communication is available.

For example, the first security management device 200 may manage the anomaly location and the anomaly amount in farther layers from the external communication ECU 10 of the electronic control system 1, and the second security management device 300 may manage the anomaly location and the anomaly amount in the shallow layers close to the external communication ECU 10 of the electronic control system 1. For example, the first security management device 200 may manage the third to seventh layers shown in FIG. 1 while the second security management device 300 manages the zeroth to second layers.

In the example described above, for the ECUs which are likely to be affected by cyber attacks, the first security management device 200 inside the electronic control system 1 implements countermeasures against the anomaly. Accordingly, the security management of such ECUs can be performed without the influence of the communication environment.

These examples may be combined with each other.
(Conclusion)

The features of the security management device and the like according to each embodiment of the present disclosure have been described above.

Terms used in the description of each embodiment are examples and may be replaced with synonymous terms or terms having a synonymous function.

The block diagram used in the description of each embodiment is a diagram in which the configurations of devices and the like are classified and organized by function. An individual function of the functional blocks may be implemented by (i) hardware alone (i.e., by using hardware circuitry including digital and/or analog circuits without CPU), or (ii) software alone (i.e., by using CPU along with memory storing program instructions), or (iii) any combination of the hardware and the software. Further, since the block diagram illustrates the functions, the block diagram can be understood as disclosure of the method and the program that implements the method.

Order of functional blocks that can be grasped as processing, a sequence, and a method described in relation to each embodiment may be changed unless some restriction is imposed, for example, a result from one step is utilized at another step.

In the above-described embodiments, the system is mounted on the vehicle. However, the present disclosure may be used for the system for special devices or general purpose devices other than vehicles.

In the above-described embodiment, the security management device is mounted on a vehicle. However, the security management device may be carried by a pedestrian.

Further, examples of the security management device of the present disclosure include the following. Examples of the security management device according to the present disclosure include a semiconductor device, an electronic circuit, a module, and a microcontroller. Example of the security management device according to the present disclosure include an electronic control unit (ECU) and a system board. Example of the security management device according to the present disclosure include a mobile phone, a smartphone, a tablet, a personal computer (PC), a workstation, and a server. Further, the security management device may be a device having a communication function such as a video camera, a still camera, a car navigation system.

In addition, necessary functions such as an antenna and a communication interface may be added to the security management device.

It may be assumed that the security management device of the present disclosure is used on the server side to provide various services. With the provision of such services, the security management device of the present invention is used, the method of the present is used, and the program of the present disclosure is executed.

The present disclosure is implemented not only by dedicated hardware having a configuration and a function described in relation to each embodiment. The present disclosure can also be implemented as a combination of a program for implementing the present disclosure, recorded on such a recording medium as memory and a hard disk and general-purpose hardware including dedicated or general-purpose CPU, memory, or the like, capable of executing the program.

A program may be stored in a non-transitory tangible storage medium including (i) an external storage (e.g., hard disk, USB memory, CD/BD), or (ii) an internal storage (e.g., RAM, ROM) in a special-purpose or general-purpose hardware (e.g., computer). Such a program may be downloaded to the storage medium in the hardware via a communication link from a server. As a result, it is possible to provide a latest function by updating the program.

The security management device of the present disclosure may be used in a system which is not mounted on a vehicle.

Additional advantages and modifications will readily occur to those skilled in the art. The disclosure in its broader terms is therefore not limited to the specific details, representative apparatus, and illustrative examples shown and described.

What is claimed is:

1. A security management device comprising at least one processor and memory configured to:
    manage a plurality of anomaly locations of anomalies in a system in which electronic controllers are connected through a network, and
    anomaly amounts in the plurality of anomaly locations;
    determine whether or not to implement countermeasures against the anomaly at each anomaly location of the plurality of anomaly locations based on each anomaly location and each anomaly amount corresponding to each anomaly; and
    output an instruction based on a determination result about whether or not to implement countermeasures to cause implementation of the countermeasures, wherein
    a corresponding threshold value is independently set for each anomaly location of the plurality of anomaly locations,
    the at least one processor is further configured to determine to implement countermeasures for a particular anomaly when the anomaly amount for the particular anomaly is equal to or greater than the threshold value corresponding to the anomaly location of the particular anomaly, and
    the threshold values set for the plurality of anomaly locations are smaller as the corresponding anomaly location is farther from an external communication electronic controller configured to communicate with a device located outside of the system.

2. The security management device according to claim 1, wherein
    each anomaly location is identified as a layer of a hierarchy whose reference layer is the external communication electronic controller configured to communicate with the device located outside of the system.

3. The security management device according to claim 1, wherein
each anomaly location is identified as a set of the electronic controllers having a specific function.

4. The security management device according to claim 1, wherein
each anomaly amount is a number of times the anomaly at the corresponding anomaly location occurred.

5. The security management device according to claim 1, wherein
each anomaly amount is (i) a time length for which the anomaly at the corresponding anomaly location continued, (ii) a size of abnormal data, or (iii) a number of abnormal data.

6. The security management device according to claim 1, wherein
the system is mounted on a moving object, and
the threshold value for the anomaly location that is any one of the electronic controllers for controlling a component of the moving object is the smallest.

7. The security management device according to claim 1, wherein
the threshold value for the anomaly location that is a communication line between the electronic controllers is smaller than the threshold value for another anomaly location that is the electronic controller.

8. The security management device according to claim 1, wherein the security management device is provided in one or more electronic controllers in the system.

9. The security management device according to claim 1, wherein
the security management device is provided in one or both of a central electronic controller and an external communication electronic controller.

10. The security management device according to claim 1, wherein
the security management device is provided outside the system.

11. A security management method comprising:
acquiring a plurality of anomaly locations of anomalies in a system in which a plurality of electronic controllers are connected through a network, and anomaly amounts in the plurality of anomaly locations;
determining whether or not to implement countermeasures against the anomaly at each anomaly location of the plurality of anomaly locations based on each anomaly location and each anomaly amount corresponding to each anomaly; and
outputting an instruction based on a determination result in the determining indicating whether or not to implement countermeasures to cause implementation of the countermeasures, wherein
a corresponding threshold value is independently set for each anomaly location of the plurality of anomaly locations,
the security management method further comprises determining to implement countermeasures for a particular anomaly when the anomaly amount for the particular anomaly is equal to or greater than the threshold value corresponding to the anomaly location of the particular anomaly, and
the threshold values set for the plurality of anomaly locations are smaller as the corresponding anomaly location is farther from an external communication electronic controller configured to communicate with a device located outside of the system.

12. A computer program product stored on a non-transitory computer readable medium and comprising instructions configured to, when executed by a security management device, cause the security management device to:
acquire a plurality of anomaly locations of anomalies in a system in which a plurality of electronic controllers are connected through a network, and anomaly amounts in the plurality of anomaly locations;
determine whether or not to implement countermeasures against the anomaly at each anomaly location of the plurality of anomaly locations based on each anomaly location and each anomaly amount corresponding to each anomaly; and
output an instruction based on a determination result about whether or not to implement countermeasures to cause implementation of the countermeasures, wherein
a corresponding threshold value is independently set for each anomaly location of the plurality of anomaly locations,
the instructions are further configured to cause the security management device to determine to implement countermeasures for a particular anomaly when the anomaly amount for the particular anomaly is equal to or greater than the threshold value corresponding to the anomaly location of the particular anomaly, and
the threshold values set for the plurality of anomaly locations are smaller as the corresponding anomaly location is farther from an external communication electronic controller configured to communicate with a device located outside of the system.

* * * * *